Oct. 29, 1935.  N. P. HARSHBERGER  2,018,718

SHINGLE ELEMENT

Filed April 11, 1930    4 Sheets-Sheet 1

INVENTOR
Norman P. Harshberger
BY
Morsell, Henry & Morsell
ATTORNEYS.

Oct. 29, 1935.   N. P. HARSHBERGER   2,018,718
SHINGLE ELEMENT
Filed April 11, 1930   4 Sheets-Sheet 2
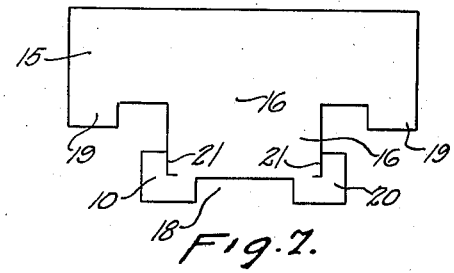
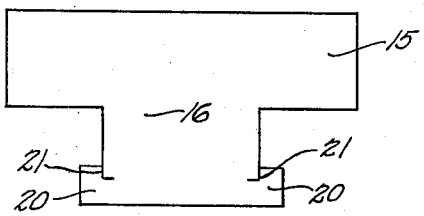
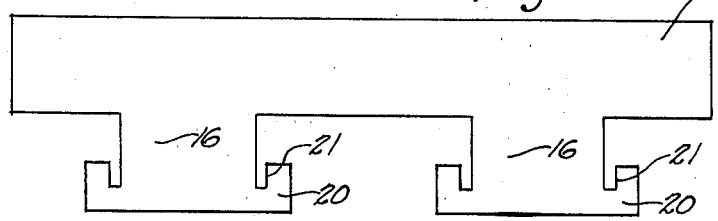
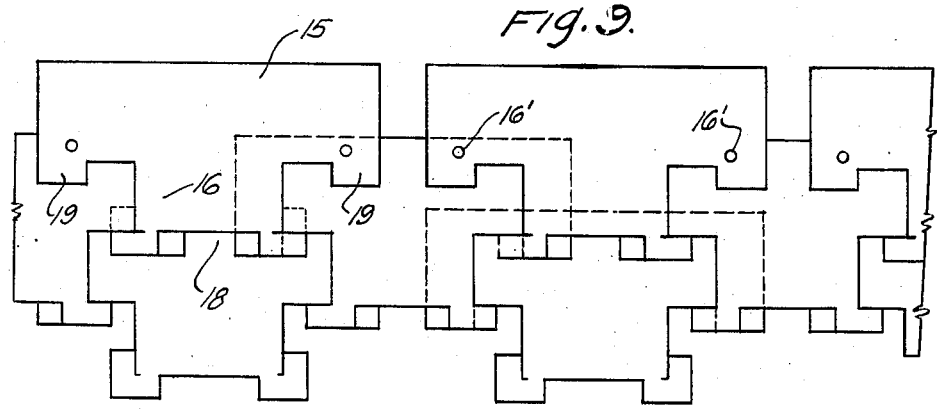
INVENTOR.
Norman P. Harshberger
BY
Morsell, Furry, & Morsell
ATTORNEYS.

Oct. 29, 1935.   N. P. HARSHBERGER   2,018,718
SHINGLE ELEMENT
Filed April 11, 1930   4 Sheets-Sheet 3

INVENTOR.
Norman P. Harshberger
BY
Morsell, Feeney, & Morsell
ATTORNEYS.

Patented Oct. 29, 1935

2,018,718

UNITED STATES PATENT OFFICE 2,018,718

SHINGLE ELEMENT

Norman P. Harshberger, Pasadena, Calif., assignor to Bakelite Building Products Co., Inc., New York, N. Y., a corporation of Delaware Application April 11, 1930, Serial No. 443,601

7 Claims. (Cl. 108—7)

This invention relates to improvements in shingle elements.

It is one of the objects of this invention to provide improved shingle elements which permit efficient covering of a roof in a very economical manner, inasmuch as said shingle elements are so proportioned that a greater percentage of exposure is provided for a given amount of material than is usually the case.

A further object of this invention is to provide improved shingle elements which present a very attractive apearance upon the roof.

It is a further object of this invention to provide shingle elements which are simple in construction and well adapted for the purpose described.

With the above and other objects in view, the invention consists of the improved shingle elements and all the parts and combinations as set forth in the claims, and all equivalents thereof.

In the accompanying drawings in which the same reference numerals designate the same parts in all of the views;

Fig. 6 is a plan view of a modified type of individual shingle;

Fig. 7 is a plan view of an additional modification showing the individual unit;

Fig. 8 is a similar view showing an element embodying a plurality of units of the type shown in Fig. 7;

Fig. 9 is a view showing a group of shingle elements of the type illustrated in Fig. 6 as assembled;

Figure 1:
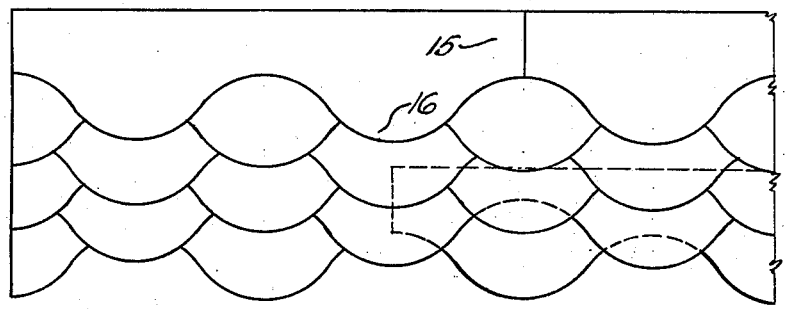
Fig. 1 is a plan view showing a group of the shingle elements as assembled on a roof.
Figure 2:
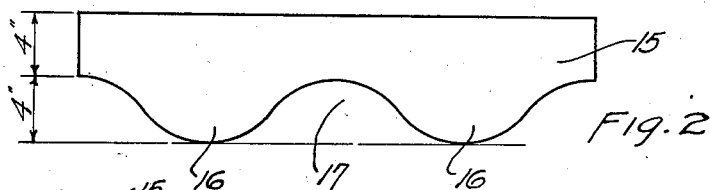
Fig. 2 is a plan view of one of said elements.

Referring to the drawings, it will be seen that the form of shingle element illustrated in Figs. 1 and 2 comprises an elongated body portion 15 having a plurality of downwardly curved tabs 16 which are spaced apart by curved recesses 17, the recesses 17 being complementary to the tabs 16. It will further be noted that the depth of the tabs is equal to the depth of the body portion as indicated in Fig. 2.

Figure 3:
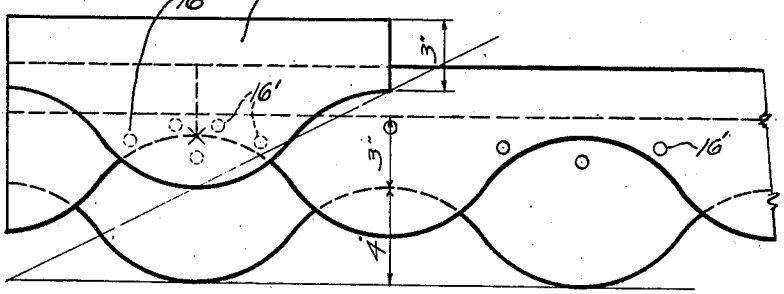
Fig. 3 is an enlarged plan view of a group of said elements showing a slightly modified form.
Figure 4:
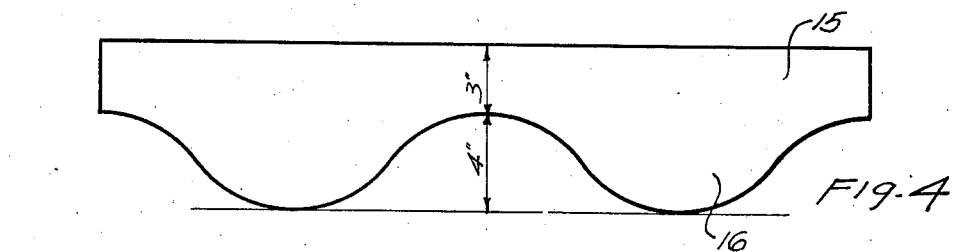
Fig. 4 is a plan view of a shingle element constructed in accordance with the modification illustrated in Fig. 3.

In Figs. 3 and 4 a slightly modified form of shingle element is illustrated, the main difference being that the depth of the tabs is greater than the depth of the body. It has been found that by so constructing the units that the depth of the body portion is equal to or less than the depth of the tabs, that a greater amount of exposure may be obtained from a given amount of shingle material. Thus, with one standard unit of roofing material a greater area of the roof can be efficiently protected. It is further to be noted that the sides of the tabs are so curved that the lower portion extends below, and the upper portion above a diagonal line extending from the center of the inner space edge to the center of the lower tab edge. (See Fig. 3).

The units are adapted to be assembled on the roof as shown in Figs. 1 and 3, one element being placed above another so that the ends of the tabs project below the inner edges of the spaces between the tabs in the lower course. Thus, a very pleasing effect is produced. Nails 16' are employed as indicated.

Figure 5:
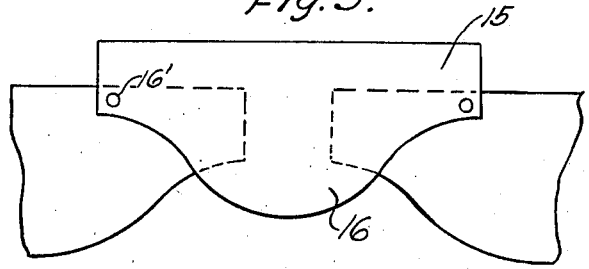
Fig. 5 is a plan view of a group of elements showing the modified method of assembly, parts being broken away.

In Fig. 5 a method of laying the units is illustrated, by means of which it is possible to obtain a still greater percentage of exposure. With this method, the ends of the elements in the same course are spaced apart. It will be noted, however, that in spite of this wide spacing, all portions of the roof will be thoroughly covered.

In the element shown in Fig. 6 it will also be noted that the depth of the tab portion is equal to the depth of the body portion. In this form the lower edge of each tab is provided with a recess 18, and the lower edge of the body on each side of the tab is provided with an extension 19, the area of each pair of extensions being equal to the area of the recess 18. The tabs are also provided on each side with laterally extending lugs 20. An L-shaped slit 21 extends downwardly from the upper edge of each of the lugs 20 to form a locking means. The said shingles are adapted to be laid as indicated in Fig. 9, the upper ends of the lugs 20 engaging beneath the lower edge of the body of a unit below adjacent the body extensions 19. Nails 16' are also used.

The shingles illustrated in Figs. 7 and 8 are similar to those just described, except that the recess 18 is omitted from the lower edge of the tab, and the extensions 19 are omitted from the lower edge of the body. With this form the upper portions of the lugs 20 are slipped beneath the lower edg of the body of units below to assemble the roofing. It will be noted that in this form also the depth of the tabs is equal to the depth of the body portion to obtain the greater percentage of exposure.

Figure 10:
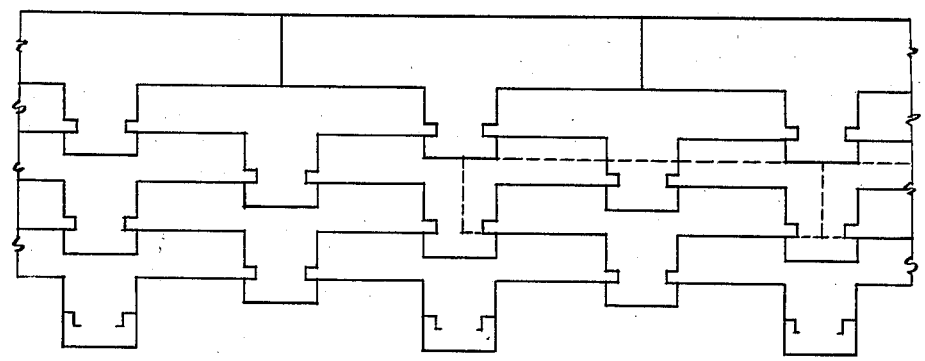
Fig. 10 is a plan view of an assembly illustrating an additional modification.
Figure 11:
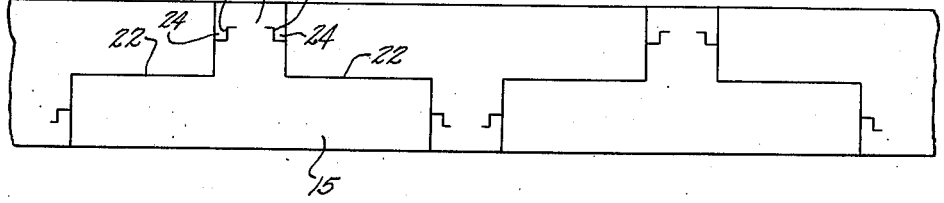
Fig. 11 is a plan view of a roofing web showing the method of cutting out the units of Fig. 10.

In Figs. 10 and 11 an additional modification is illustrated. In this modification the units are cut from the web by making pairs of irregular transverse cuts 22 transversely of the web, then lengthwise of the web, and then transversely to the opposite edge, each cut converging toward the adjacent one to form the body portions 15 and tab portions 16, the entire units being T-shaped in appearance. The sides of the tabs are also provided with substantially Z-shaped locking slits 23 which extend inwardly from an edge. The said cuts form lugs 24 which are slipped beneath the body portion of a unit positioned below in assembly as indicated in Fig. 10. In this type of shingle it will also be noted that the depth of the body portion is equal to the depth of the tab, so that the maximum amount of exposure may be obtained.

Figure 12:
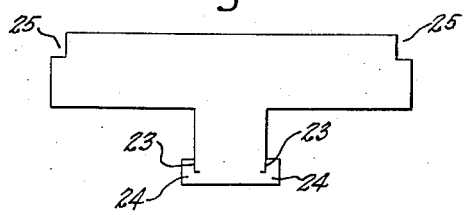
Fig. 12 is a plan view of a shingle showing a modification of the general type illustrated in Figs. 10 and 11.

In Fig. 12 a modified form is shown wherein the body portion 15 is of substantially equal depth to the tab 16. Said tab as in the shingle of Fig. 7 has laterally extending lugs 24 on opposite sides, with an L-shaped slit 23 extending downwardly from the upper edge of each of the lugs to form a locking means. Said shingle is cut from a blank in much the same manner shown in Fig. 11, the lugs 24 of one element being formed from material removed from the corners of the body of an adjacent element as at 25. The shingles of Fig. 12 are laid on a roof in substantially the same manner as illustrated in Fig. 10.

Figure 13:
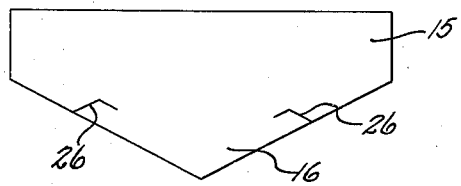
Figs. 13 and 14 are plan views of an additional modified form.
Figure 14:
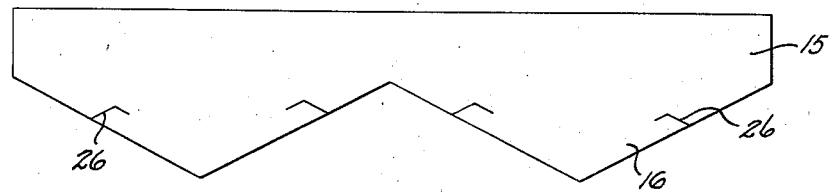

In Figs. 13 and 14 another type of shingle is shown in which the depth of the body 15 is less than the depth of the tab 16. In this type the tabs are V-shaped and are formed with locking slits 26.

Figure 15:
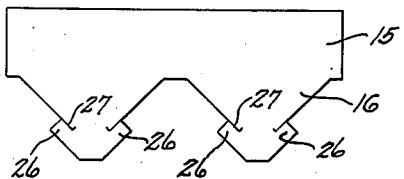
Fig. 15 illustrates another modification.
Figure 16:
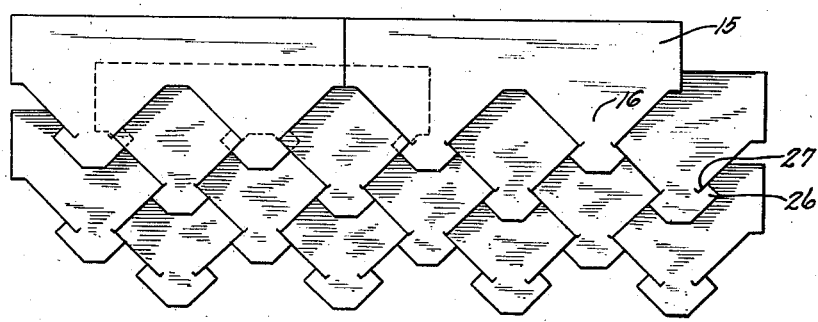
Fig. 16 is a view showing a group of shingle elements of the type illustrated in Fig. 15 as assembled.

In Fig. 15 still another modification is disclosed, the depth of the body portion 15 being less than the depth of the tabs 16. Said tabs are V-shaped and are provided with pairs of lugs 26 having slits 27 extending diagonally downwardly from their upper edges. Assembly of this type is illustrated in Fig. 16, the lugs 26 engaging beneath the sides of the tabs of the course below.

From the foregoing description it may be seen that due to the particular proportions of the vrious shingle elements in which the depth of the body portion is made equal to, or less than, but not greater than the depth of the tabs, that a construction is provided in which a roof can be very inexpensively yet effectively covered.

What I claim is:

1. Shingle elements laid in overlapping courses with each course comprising a plurality of separate elements, each element comprising a body portion having a lower edge formed with ogee curves to provide alternating curved tabs and recesses, the taps of one course projecting below the edges of the recesses of a course below, certain of the tabs thus affording protection over and below adjacent ends of two elements of the same row, the distance between the lowermost portion of the adjacent ends of the elements and the lowermost portion of the overlapping tab being the shortest distance between said lowermost portion of said adjacent ends and any edge portion of the overlapping tab to thereby provide maximum protection over the adjacent ends of the two elements.

2. Shingle elements laid in overlapping courses with each course providing a plurality of separate elements, each element comprising a body portion having a lower edge formed with ogee curves to provide alternating curved tabs and recesses, the tabs of one course projecting below the edges of the recesses of a course below, certain of the tabs thus affording protection over and below the abutting ends of two elements in the same row, the distance between the lowermost portion of said abutting ends and the lowermost portion of the overlapping tab being the shortest distance between said lowermost portion of the abutting ends and any edge portion of the overlapping tab to thereby provide maximum protection over the weak point at the abutting ends of two elements.

3. Shingle strips laid in overlapping courses, each strip comprising a body portion having a lower edge formed with ogee curves and providing alternating curved tabs and recesses, the tabs of one course projecting below the edges of the recesses of a course below, the distance between the uppermost portion of the recesses and the lowermost portion of the overlapping tab being the shortest distance between said uppermost portion of the recess and any edge portion of the overlapping tab to thereby afford maximum protection over the recesses.

4. Shingle elements laid in overlapping courses with each course comprising a plurality of separate elements, each element comprising a body portion the lower edge of which has in general the contour of ogee curves to provide alternating tabs and recesses, the tabs of one course projecting below the edges of the recesses of a course below, certain of the tabs thus affording protection over and below adjacent ends of two elements in the same row, the distance between the lowermost portion of adjacent ends of the elements and the lowermost portion of the overlapping tab on a vertical median being the shortest distance between said lowermost portion of said adjacent ends and any edge portion of the overlapping tab to thereby provide maximum protection over the adjacent ends of two elements.

5. Shingle elements laid in overlapping courses with each course comprising a plurality of separate elements, each element comprising a body portion having alternating tabs and recesses, the tabs being so shaped that the center of the lower edge of each tab and the center of the upper edge of each recess are respectively below and above directly adjacent edge portions of said tab and recess, and said edge portions presenting a formation extending in a direction of varying slope from the center of the lower edge of each tab to the center of the upper edge of each recess, the tabs of one course projecting below the edges of the recesses of a course below, certain of the tabs thus affording protection over and below adjacent ends of two elements of the same row, the distance between the lowermost portion of the adjacent ends of the elements and the lowermost portion of the overlapping tab being the shortest distance between said lowermost portion of said adjacent ends and any edge portion of the overlapping tab to thereby provide maximum protection over the adjacent ends of two elements.

6. Shingle elements assembled in overlapping courses upon a surface with each course comprising a plurality of separate elements, each element having freely depending tabs comprising a body portion the lower edge of which has a substantially ogee formation providing alternating tabs and recesses of greater width than depth and of no less depth than the body portion, the tabs of one course projecting below the edges of the recesses of a course below so as to afford protection over and below adjacent ends of elements in said course below, said assembly producing vertical rows of figures of substantially circular ring sector formation upon the surface.

7. A shingle strip comprising a substantially straight upper edge and a lower edge forming alternate tabs and recesses, the tabs shaped that the center of the lower edge of each tab and the center of the upper edge of each recess, each respectively below and above directly adjacent edge portions of said tabs and recesses and said tab edge portion presenting a formation extending substantially in a direction of varying slope from the center of the lower edge of each tab to the center of the upper edge of each recess, each strip having a vertical distance between its upper edge and the uppermost point of a recess on the lower edge no greater than the vertical distance between said uppermost point of said recess on the lower edge and the lowermost point of a tab and each tab and recess between tabs having a width greater than its depth, said shingle strip enabling the economical coverage of a surface when laid with the tabs freely depending and projecting below the edges of the recesses of strips of a course below.

NORMAN P. HARSHBERGER.

CERTIFICATE OF CORRECTION.

Patent No. 2,018,718. October 29, 1935.

NORMAN P. HARSHBERGER.

It is hereby certified that error appears in the printed specification of the above numbered patent requiring correction as follows: Page 3, first column, line 6-7, claim 6, strike out the comma and words ", each element" and insert the same after "tabs" in line 7; second column, line 2, claim 7, after "recess" strike out the comma; and same line, for "each" second occurrence, read are; and that the said Letters Patent should be read with these corrections therein that the same may conform to the record of the case in the Patent Office.

Signed and sealed this 18th day of February, A. D. 1936.

Leslie Frazer

Acting Commissioner of Patents.

(Seal)